Patented Sept. 8, 1942

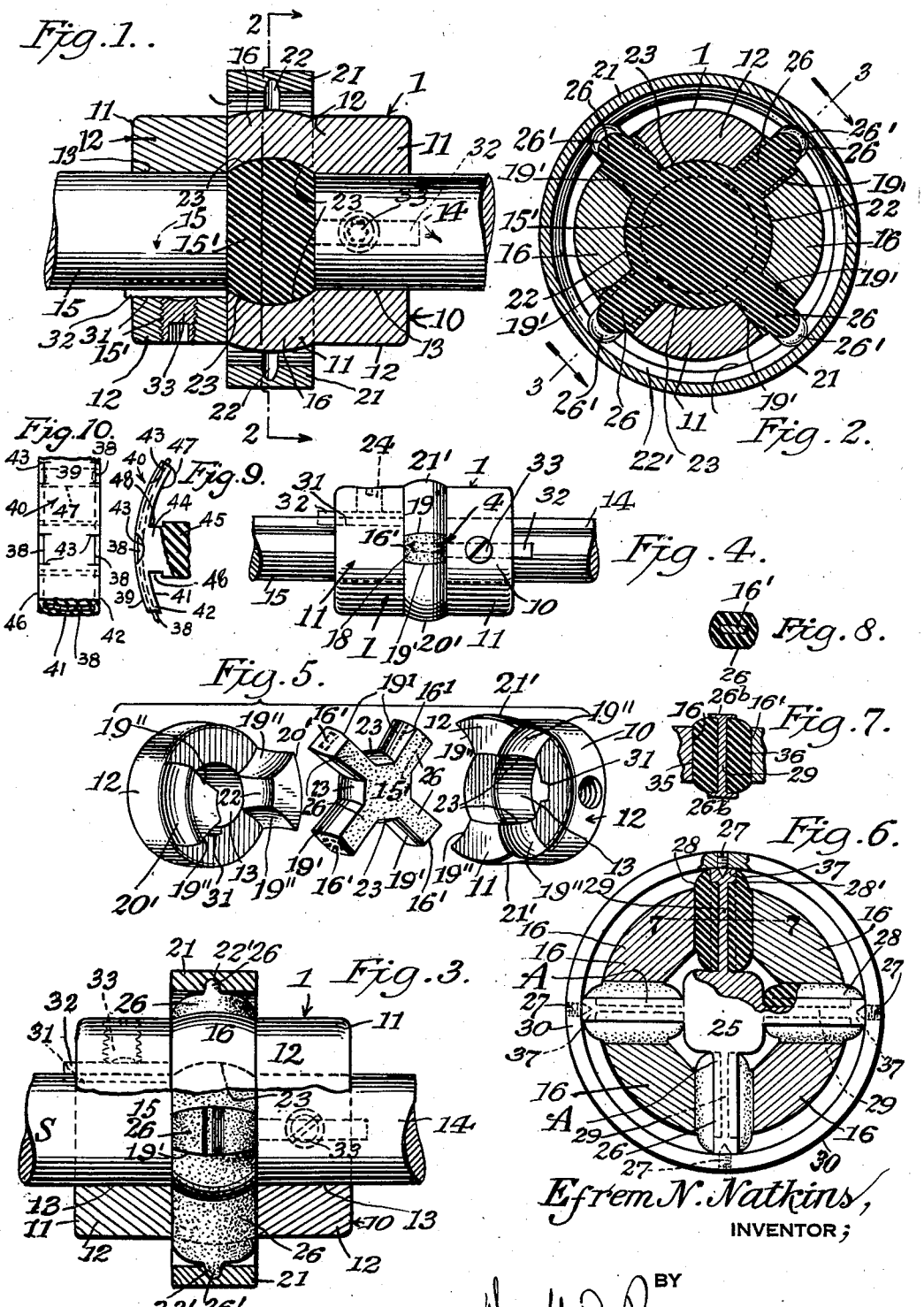

2,295,003

UNITED STATES PATENT OFFICE 2,295,003

FLEXIBLE DRIVE COUPLING

Efrem N. Natkins, New York, N. Y.

Application June 27, 1940, Serial No. 342,656

4 Claims. (Cl. 64—14)

This invention relates to a flexible coupling for attachment to adjacent ends of line drive shafting for compensating for mis-alignment and for assuring uniform power transmission and compression and further, reducing power loss to a minimum, in such misaligned line shafting.

The present coupling contemplates improvements and additions of a practical nature over the coupling shown and described in U. S. Patent #2,022,626, issued to Certified Flexible Couplings, Inc., inventor William Weis, issued Nov. 26, 1935.

Features of the present improvement comprise a pair of opposed drive yokes of metal, each yoke being constituted by a circular head forming element, the hubs thereof being centrally bored for receiving opposite ends of drive shaft sections which have key-way connections with the heads, and appropriate key locking screws.

These yokes further comprise opposite outstanding drive extensions or lugs, here shown as two in number for each yoke and when assembling the coupling, the lugs of the opposite yokes are located in staggered or alternate circumferential positions around the axes of the said heads and this condition leaves a central opening and four radial spaces into which a flexible or elastic insert or spider may be forced axially of the yokes and into interlocking engagement between certain concavo surfaces in the lugs and coacting convexo surfaces on said spider.

From the foregoing, it will be apparent that the insert or flexible body is held centrally and operatively captive, in a great measure by and between the concavo faces of the above described lugs and I provide further means for controlling the pressure extrusion of the flexible body of the spider when the coupling is working under heavy torsional working compression.

A further feature resides in forming arms on the spider to extend them radially and externally of the yoke diameters for contacting interiorly with a stiff metal ring which is internally grooved and circumposed over the extended ends of the spider at the longitudinal center of said coupling, when assembled.

I provide a further modified feature for greater strength in super-pressure torsional drive shaft lines, for transmitting greater horsepower, which comprises a metal ring, within which is locked by radial screws on the ends of a metal spider having oppositely channeled radial arms for receiving opposed, flexible and replaceable cushions which are fitted between the channels of the arms and the concavo side surfaces of the lugs of said yokes.

A further feature of advantage is in the provision of an interiorly located and moulded in metal spider within one form of the flexible spider, this feature being provided to stiffen the flexible spider.

The foregoing, and other features of advantage will be apprehended as the herein description proceeds and it will be obvious that modifications may be made in the structure herein disclosed, without departing from the spirit hereof or the scope of the appended claims.

In the drawing:

Fig. 1 is a longitudinal sectional elevation one form of my coupling attached to adjacent ends of a drive shaft line;

Fig. 2 is a cross sectional elevation taken about on the broken line 2—2 of Fig. 1;

Fig. 3 is a partial sectional elevation through the coupling taken about on the line 3—3 of Fig. 2;

Fig. 4 is a reduced side view of the flexible coupling showing a modified form or reinforced cushion spider and of a simpler type;

Fig. 5 is a view showing in perspective detail, the separated, component parts of the simpler form of the universal compression drive coupling and disclosing clearly the concavo and convex surfaces of the parts for interlocking them in operative position, automatically, without the aid of screws, bolts or otherwise;

Fig. 6 is a cross sectional elevation of a modified heavy-duty coupling employing a spider having channeled, metal arms with their ends secured against side and radial strains and mounting compressible cushions;

Fig. 7 is a detail cross section through one of the spider arms and its compressible cushion and taken on the line 7—7 of Fig. 6;

Fig. 8 is a cross sectional view of one of the arms of the flexible spider of Fig. 5 showing the metal spider insert;

Fig. 9 is a fragmental view in elevation of modified form of joint construction; and Fig. 10 is a fragmentary plan view of Fig. 9.

In the construction of the improved coupling here shown generally at 1, Figs. 1 and 3; a pair of identical yokes 11, are employed and each has a cylindrical hub or head 12, each hub having a bore 13, for receiving the opposite ends, respectively, of a driving shaft 14, and a driven shaft 15.

Projecting from their adjacent faces, each cylindrical hub 12 is formed with two longitudinally curved lugs 16—16 having tangentially curved, concavo sides 19'', for receiving between them a flexible spider the arms or projections 26 of which have convex sides 19'; the arms are of flexible material, such as rubber, and radiate from the common central body or hub 15' of the same flexible material.

The arms 26—26, Fig. 8, of the flexible spider are each provided with reinforcing metal inserts 16' forming an interior stiffening spider, these metal arms being joined at their common center, to form a single cruciform reinforcement, being radially arranged to each other and have the flexible spider moulded about said arms and center. The metal arms 16' may be flat, and so located in the interior of the arms of the flexible spider as to lie flatwise between the encompassing pressure yoke arms 20'—20' and 21—21', Fig. 4, the end of one of the stiffening arms 16' being shown dotted therein.

In the form shown in Figs. 1, 2 and 3, I circumpose the stiff ring 21, having an internal, central annular groove 22, Figs. 2 and 3, over the central portion of the coupling, the cushion spider having outstanding extensions 26' on the outer ends of each of the spider arms 26, which are forced sidewise into the ring to engage in said groove, Fig. 3, and thus to form a lock against the lateral displacement of the ring 21. The radial extensions 26' are compressed against the inner face of the groove 22 and prevent the spider arms 26 of the flexible insert from extruding excessively, in a radial direction under load conditions. Thus the coupling spider cushion is protected, and held for the limiting of the elongate extension of the resilient spider arms 26 under load, and thereby the load transmitting capacity of the resilient spider is greatly increased due to the transverse and end encircling compression confinement of the rubber spider.

In Figs. 6 and 7 there is shown a coupling having the same functions as described for the coupling of Figs. 3 and 4, the structural details of which vary over the coupling of Fig. 4. Due to the variant structure the coupling of Figs. 6 and 7, it becomes a heavy duty coupling and can transmit greater loads under long periods of use, and may be easily repaired by replacement of parts that may break down. To this end, this modified coupling, Fig. 6, comprises two metal yokes, the same as described and shown in Fig. 3, having shaft engaging sleeve or hub portions 11—11, same as in Fig. 3, but not shown, having key-ways 31 thereon to receive keys 32, which are held by set screws 33 to lock the yokes to their respective shafts 14 and 15.

The flexible spider comprises an inner metal spider cushion seating quadrant having a solid hub 25, from which radially extend four integral arms 29, which are equally spaced, Fig. 6, the arms being flat with their flat faces positioned to be parallel with the opposing yoke driving faces 16 and 16', Fig. 7, the opposite side edges of the arms 29 having narrow flanges 26b thereon, the outer ends of the arms 29 being also provided with end capping flanges 37, thus forming rectangular shaped pockets A on the opposite faces of said arms, as shown in Fig. 6, where broken away.

Into the pockets A on each side of said arms is inserted moulded, rubber cushion pieces 28 and 28', these being moulded to snugly fit the rectangular pockets A and each having an extending, curved cushioning face to fit against the concave faces 35—36 of the yoke members 16 and 16', respectively, Fig. 7.

As thus shown and described the cushion elements 28—28' are firmly held in their operative positions and may be easily replaced when wear or disintegration takes place. The outer extending faces of the cushion members 28 and 28' may be arcuate as at 35 and 36, Fig. 7, to enable the cushions to be pressed into operative position between the arcuate faced yokes 16 and 16' and firmly held.

The ends of each of the cushions 28—28' are so moulded as to be formed and fit about the end flanges 37 and also to extend beyond the coupling yokes 16 and 16'.

In order to protect the arms 29 and the outer ends of the cushions 28 and 28', an outer protective metal ring 30 is located over the midsection of the assembled coupling as shown in Fig. 6, the inner face of said ring 30 being located upon the end flanges 37 of the arms 29 and a cone pointed headless set screw 27 is threadedly mounted in the ring 30, at each flange 37, the cone point of each set screw being seated in each said flange, as shown in Fig. 6, in dotted and full lines. Thus the protecting ring 30 is firmly, removably and operatively held in cushion end protecting position. Due to this construction the cushions 28—28' are easily removed and replaced when required.

In Figs. 9 and 10 there is disclosed fragmental views, by way of illustration, of a modified structure, which while lending itself to the desirable and practical features of the structures hereinbefore disclosed, for Figs. 1 to 8 inclusive, the interior construction of the cushion coupling is without inner, metal spider reinforcing means, though the outer rim is metal reinforced and rubber covered.

The view, Fig. 9 discloses sufficient of the modified structure, it is thought, to disclose the desired features.

The central or spider portion of the cushion coupling, generally denoted by 40, may comprise a central rubber hub, not shown, but similar to the hub 23 of Fig. 1. From this hub may extend a suitable number of plural, integral radial arms, one of which 44, 45, is fragmentarily shown in Fig. 9. These arms are of solid rubber and preferably molded integrally with said hub.

The outer extremities of the arms as shown in Fig. 9 are so moulded as to be integral with an outer rubber annulus 39, in the interior of which is located an endless metal ring 38, the opposite edges of which may be exposed, by molded in recesses 43, Fig. 9, these recesses being located at desired intervals about both perimetral edges of the rubber annulus 39. These recesses may be utilized as interengaging driving means when so desired, between coacting coupling parts, not shown.

Further, the inner face 41 of the rubber annulus 39, as may be seen in Fig. 9, may be provided with traversing protuberances 47, which are, preferably, integrally moulded on said inner rim face 41, and these protuberances may also be used as interengaging means, or keys, for mechanical engagement with the metal portions of the metal driver and driven yokes, shown in Fig. 5, thus to, in part, stabilize and resiliently distribute the reaction of the driving forces exerted in the coupling, during operation.

Further, traversing recesses such as 48—48, Fig. 9, located at the junction of the arms 45 and the inner rim face 41 may also be interfitted with means provided on the arms of the metal driver and driven yokes, for similar traction and drive reaction purposes.

From the foregoing it will be noted that the structure of the modified form of cushion coupling disclosed in Figs. 9 and 10, comprise a ringed spider 40, moulded of solid rubber of toughened, but resilient nature, fitted to be receivably assembled between two metal driving yokes, but which coupling is provided with only an outer metallic, moulded in annulus 38, which acts to retain the spider cushion construction in circular compressive assembly, against expansion action, but is integral with the resilient cushion spider.

Having thus described the invention what is claimed is:

1. The combination with adjacent ends of a drive shaft, of a coupling comprising opposed yokes locked to said respective ends; each yoke comprising a head and spaced lugs extending inwardly therefrom and spaced alternately and circumferentially around the axes of said shafts; a flexible insert having radial arms and a central hub or body of such proportions to be forced into contact with the inner and side faces of said lugs; extensions integral with the ends of said flexible arms of the insert; an abutment ring having a continuous groove in its inner face, said ring being circumposed over said lugs and the ends of said arms and said groove adapted for receiving said end extensions of said arms; said ring acting to limit the material of the flexible arms against excessive outward extruding movement between said lugs under torque compression.

2. The combination with adjacent ends of a drive shaft, of a coupling comprising opposed, spaced yokes locked to said respective ends; each yoke comprising a head and spaced lugs extending inwardly therefrom and spaced alternately and circumferentially around the axes of said shafts; a flexible, cruciform insert having radial arms and a central hub or body of such proportions to be sprung into contact with the inner and side faces of said lugs; flexible extensions on the ends of the arms of the insert; an abutment ring having a continuous groove in its inner face, said ring being circumposed over said lugs and the ends of said arms and said groove seating the end extensions of said arms; said ring acting to limit the material of the flexible arms against excessive outward extruding movement between said lugs under driving torque compression.

3. The combination with adjacent ends of a drive shaft, of a coupling comprising opposed yokes keyed to said respective ends; each yoke comprising a cylindrical hub and spaced lugs extending inwardly therefrom and spaced alternately and circumferentially around the axes of said shafts; a flexible spider having convexed faced radial driving arms and a central, integral hub or body, said spider being of such proportions as to be sprung into contact with the inner and side faces of said lugs; said lugs having concave spider receiving faces thereon; extensions on the ends of said spider arms; a protective metal abutment ring having a groove in its inner face, said ring being circumposed over said lugs; said groove forming a seat for the ends of said extensions and acting to limit the material of the flexible arms against excessive outward extrusion between said lugs under driving torque compression.

4. A coupling comprising a pair of opposed alineable yoke members each comprising a rotary yoke and spaced lugs, the lugs of one member being disposed between lugs of the other member; an insert between said members comprising a central body substantially at the axis of the yokes having yieldable radial arms disposed between and engaging adjacent faces of adjacent lugs; the lug faces engaging each arm and the engaged arm-faces being approximately parallel to each other and to a radial plane passing midway between the faces of the arm, thereby eliminating tendency to carry the arm from between the lugs; the outer end portions of the arms where they project from the lugs being reduced so as to lie entirely between and away from the planes of said parallel faces; and a restraining ring disposed around the assembly of lugs and insert and substantially spaced from the lugs, and entirely carried by the outer ends of the arms.

EFREM N. NATKINS.